Figure 1:
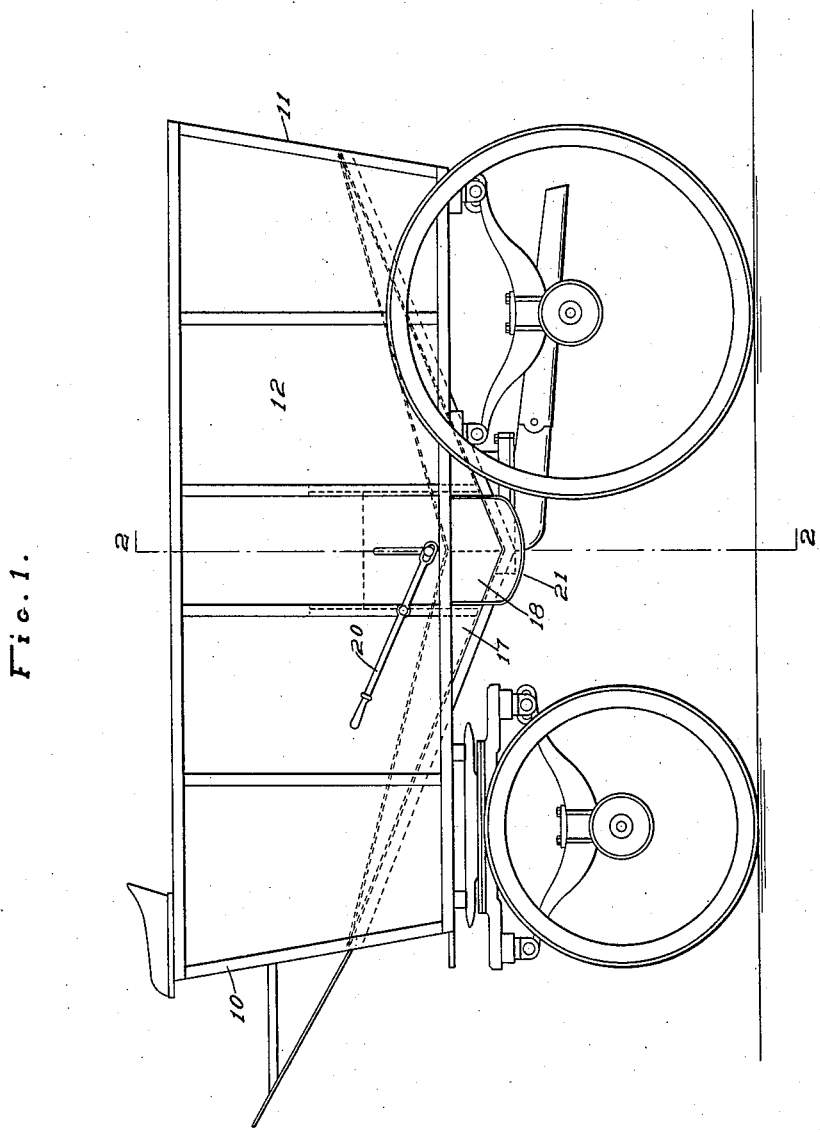

W. A. BRANDENBURG.
TRUCK.
APPLICATION FILED NOV. 3, 1911.

1,024,614.

Patented Apr. 30, 1912.
2 SHEETS—SHEET 1.

WITNESSES:

INVENTOR
Wm. A. Brandenburg
BY
ATTORNEY

W. A. BRANDENBURG.
TRUCK.
APPLICATION FILED NOV. 3, 1911.

1,024,614.

Patented Apr. 30, 1912.

2 SHEETS—SHEET 2.

WITNESSES:

INVENTOR
Wm. A. Brandenburg
BY
C. W. Fairbank
ATTORNEY

UNITED STATES PATENT OFFICE.

WILLIAM A. BRANDENBURG, OF NEW YORK, N. Y.

TRUCK.

1,024,614.　　　　　Specification of Letters Patent.　　Patented Apr. 30, 1912.

Application filed November 3, 1911. Serial No. 658,368.

*To all whom it may concern:*

Be it known that I, WILLIAM A. BRANDENBURG, a citizen of the United States, and a resident of the borough of Brooklyn, city, county, and State of New York, have invented certain new and useful Improvements in Trucks, of which the following is a full, clear, and exact description.

This invention relates to certain improvements in trucks adapted for use in transporting coal, sand or other loose material, and the object of the invention is to improve the facilities for discharging the load and simplify the discharging mechanism.

In my improved truck, the load may be readily delivered either from the side or from the rear, and the bottom is so formed that upon uncovering the discharge opening, the entire contents will be discharged without necessitating any shoveling or other manual handling of the material. At the same time, the bottom is set comparatively low so as to lower the center of gravity of the load and facilitate the carrying of larger loads.

Reference is to be had to the accompanying drawings which form a part of this specification and in which similar reference characters indicate corresponding parts in the different views.

Figure 3:
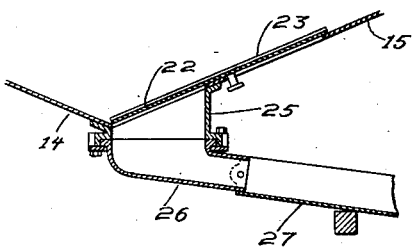
Figure 4:
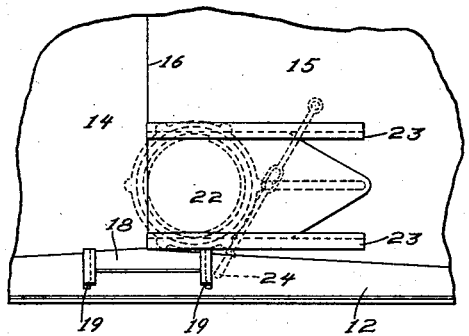
Figure 2:
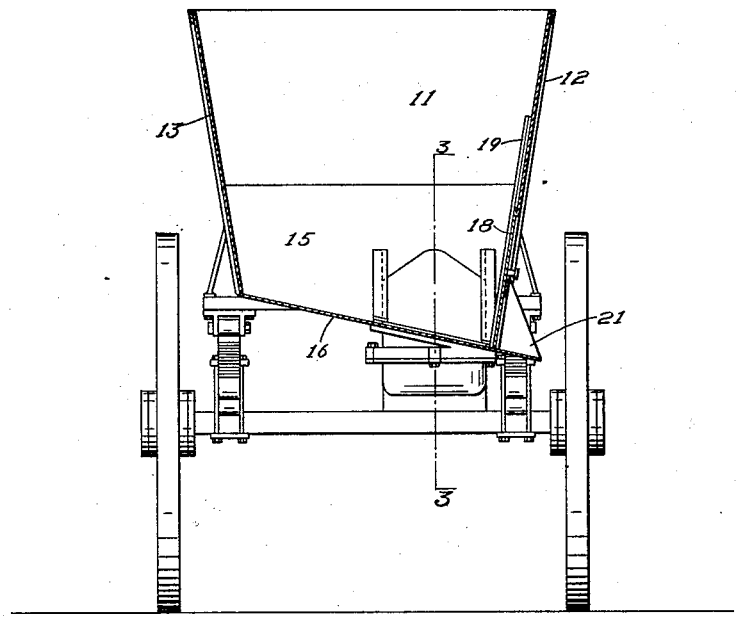

Figure 1 is a side elevation of a truck constructed in accordance with my invention; Fig. 2 is a transverse section on the line 2—2 of Fig. 1; Fig. 3 is a vertical section on the line 3—3 of Fig. 2; and Fig. 4 is a top plan view of a portion of the bottom of the truck.

My invention may be embodied in trucks adapted to be drawn by horses or in motor trucks, inasmuch as it does not in any way relate to the running gear. I have illustrated a horse-drawn vehicle constructed to embody my invention, but do not wish to be limited to this type of vehicle.

The body of my truck may be formed of any suitable material, but is preferably made of sections of sheet steel riveted together. The truck has front and rear end walls 10 and 11, which diverge slightly, and left and right side walls 12 and 13, which also diverge slightly. The bottom of the truck is formed of front and rear sections 14 and 15 and all of the walls and bottom are suitably and rigidly connected together. All four walls are substantially straight along their lower edges and all of these edges lie in the same horizontal plane, but the bottom is not secured to the walls at these lower edges. The bottom sections 14 and 15 are inclined downwardly toward each other so as to meet at an angle along a line 16 inclined laterally, that is, at one side of the truck it is higher than at the opposite side. The opposite upper edges of the bottom sections are substantially horizontal and the sections are warped to give the double inclination of the lower or meeting parts. At the side of the truck 13, the meeting line 16 of the bottom sections terminates substantially flush with the lower edge of the side wall, but at the opposite side, the line terminates some distance below the bottom edge of the side wall 12 and the said side wall has a triangular extension 17 of a length equal to approximately one-third the total length of the body of the truck.

I have illustrated the truck with the inclination of the bottom toward the lefthand side, but in actual practice, particularly where the truck is to be used in cities having strict traffic regulations, the bottom would be inclined toward the righthand side. Of course, inclination can be made in either direction desired.

For discharging the load, I provide this triangular extension 17 with an opening below the lower edge of the side wall 12 and provide any suitable form of closure for this opening. In the specific form illustrated, I employ a gate 18 mounted to slide between guides 19 so as to cover or uncover the opening. The gate may be operated in any suitable manner as, for instance, by a lever 20 pivoted on the side wall. It will be noted that this opening is at the lowermost portion of the body of the truck and with all parts of the bottom sloped toward this opening, so that when the gate is raised, the entire contents of the truck may readily discharge. For directing the material into a receptacle or portable chute, I may provide the side wall with a short chute 21 directly below the opening, as shown particularly in Fig. 2.

It is often that the truck cannot be drawn up to the curb or for some other reason it is inconvenient to utilize the side delivery above described. One of the important features of my invention is the means which I employ for delivering the material in any direction, that is, toward either side or toward the rear. To accomplish this, the bottom section 15 is provided with an opening closely adjacent its lowermost point, that is, near the meeting line 16 of the two bottom sections and near the side wall 12. This opening is normally covered by a sliding gate 22 held between guides 23 and operated by any suitable mechanism, for instance, a pivoted lever 24. Secured to the lower surface of the bottom is an annular flange 25 of such shape that its lower edge lies substantially in a horizontal plane, even though the bottom of the wagon at the point of attachment of this flange be inclined both longitudinally and transversely of the truck. This annular flange serves as a very short conduit for the material delivered through the opening in the bottom and at the lower end of the flange is an elbow 26 so connected to the flange that it may swing about a vertical axis and deliver in any direction about the compass. Detachably connected to the lower end of this elbow is a chute 27, which normally is carried beneath the rear portion of the truck. It may, if desired, have its free end supported by the rear axle of the truck. With this chute in the position indicated, the truck may deliver its contents into a receptacle or manhole at the rear of the truck. The chute may be swung around so as to get the material in the proper direction and avoid the necessity of accurately placing the truck. Furthermore, the chute 27 may be detached and the elbow swung around toward either side and the chute attached so as to deliver material at any desired point.

Having thus described my invention what I claim as new and desire to secure by Letters Patent is:

1. A truck having side and end walls and a bottom formed of two sections each inclined downwardly toward the other and each inclined laterally toward one side of the truck and an outlet in one side wall adjacent the lowermost portion of said bottom.

2. A truck having side and end walls and a bottom formed of two sections inclined downwardly toward each other and inclined laterally toward one side of the truck and an outlet in said bottom at its lowermost portion and closely adjacent one side.

3. A truck body having side and end walls all terminating at their lower edges in substantially the same plane and a bottom including two sections rigidly connected to said sides and ends, the edges of said sections at the ends of said body being above the lower edges of said end walls and the transverse meeting line of said sections terminating adjacent to the lower edge of one of said side walls and below the lower edge of the opposite side wall and said last-mentioned side wall having a triangular extension substantially in its own plane and provided with an outlet opening.

In testimony whereof I have signed my name to this specification in the presence of two subscribing witnesses.

WILLIAM A. BRANDENBURG.

Witnesses:
    WORTHINGTON CAMPBELL,
    JEANNETTE WILLIAMS.

---

Copies of this patent may be obtained for five cents each, by addressing the "Commissioner of Patents, Washington, D. C."